United States Patent
Maeshima et al.

(10) Patent No.: US 11,929,529 B2
(45) Date of Patent: Mar. 12, 2024

(54) FUEL CELL SYSTEM AND METHOD OF OPERATING THE SAME

(71) Applicant: NISSAN MOTOR CO., LTD., Yokohama (JP)

(72) Inventors: Susumu Maeshima, Kanagawa (JP); Akinobu Moriyama, Kanagawa (JP); Tatsuya Yaguchi, Kanagawa (JP); Masashi Sato, Kanagawa (JP); Tadaki Mano, Kanagawa (JP); Hiroyuki Wada, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 560 days.

(21) Appl. No.: 17/058,792

(22) PCT Filed: May 30, 2018

(86) PCT No.: PCT/JP2018/020751
§ 371 (c)(1),
(2) Date: Nov. 25, 2020

(87) PCT Pub. No.: WO2019/229877
PCT Pub. Date: Dec. 5, 2019

(65) Prior Publication Data
US 2021/0202966 A1    Jul. 1, 2021

(51) Int. Cl.
*H01M 8/04082* (2016.01)

(52) U.S. Cl.
CPC .... *H01M 8/04201* (2013.01); *H01M 2250/20* (2013.01)

(58) Field of Classification Search
CPC ......... H01M 8/04201; H01M 2250/20; H01M 8/04082; H01M 8/04302; H01M 8/0432; H01M 8/04328; H01M 8/04335; H01M 8/04388; H01M 8/04395; H01M 8/0606; H01M 8/0662; H01M 16/006; H01M 8/04007; Y02E 60/10; Y02E 60/50; Y02T 90/40
See application file for complete search history.

(56) References Cited

U.S. PATENT DOCUMENTS

| | | | |
|---|---|---|---|
| 2001/0014301 A1 | 8/2001 | Nakamura et al. | |
| 2002/0025458 A1 | 2/2002 | Faville et al. | |
| 2002/0155331 A1* | 10/2002 | Kamegaya | H01M 8/0662 429/412 |
| 2002/0187051 A1* | 12/2002 | Maier | F04C 11/005 417/205 |
| 2005/0089732 A1* | 4/2005 | Aoyama | H01M 8/04223 422/198 |
| 2006/0225346 A1* | 10/2006 | Yamaguchi | H01M 8/0612 48/127.9 |
| 2010/0015491 A1* | 1/2010 | Yamanis | H01M 8/0247 429/515 |
| 2014/0038071 A1* | 2/2014 | Ogawa | H01M 8/04753 429/425 |
| 2016/0102618 A1* | 4/2016 | Payne | F02D 41/0025 123/575 |

FOREIGN PATENT DOCUMENTS

| | | |
|---|---|---|
| JP | 2001-180904 A | 7/2001 |
| JP | 2005-100772 A | 4/2005 |

\* cited by examiner

*Primary Examiner* — Muhammad S Siddiquee
(74) *Attorney, Agent, or Firm* — Foley & Lardner LLP

(57) ABSTRACT

The fuel cell system includes a fuel cell, a first injection device associated with a supply of a fuel to the fuel cell, and a second injection device provided on an upstream side of the first injection device in a fuel flow passage from a fuel storage unit to the first injection device. The first and second injection devices switch a flow passage extending downstream from the fuel flow passage, between a first flow passage via the first injection device and second flow passage via the second injection device. The second injection device operates at a lower frequency than the first injection device during an operation of the fuel system.

11 Claims, 9 Drawing Sheets

FUEL CELL SYSTEM AND METHOD OF OPERATING THE SAME

TECHNICAL FIELD

The present invention relates to a fuel cell system including a plurality of injection devices for injecting raw fuel and a method for operating the same.

BACKGROUND ART

JP2005-100772A discloses a fuel cell system having a plurality of injection devices as injection devices for injecting raw fuel for a fuel cell. Specifically, the fuel cell system includes a main fuel injection valve, a supply destination of which is a main combustion unit of a combustor and a sub fuel injection valve, a supply destination of which is a sub combustion unit of the combustor. The main fuel injection valve and the sub fuel injection valve are used separately depending on the situation (paragraph 0017).

SUMMARY OF INVENTION

In a fuel cell system having a plurality of injection devices, when the injection device that actually operates during an operation of the system is switched depending on the situation like this, the following problem may arise. Stopping an operation of a part of the injection devices causes stagnation in a flow passage of the raw fuel depending on an arrangement of the injection devices, and affects the state of the stopping injector or the operating injector. When stagnation occurs, since the sufficient cooling effect by the raw fuel as a cooling medium cannot be obtained, this problem becomes more remarkable in a system having a fuel cell which operates at a high temperature, such as a solid oxide fuel cell.

It is an object of the present invention to provide a fuel cell system and a method for operating the same taking the above-mentioned problems into account.

According to an aspect of the present invention, a fuel cell, a first injection device associated with a supply of fuel to a fuel cell, and a second injection device provided on an upstream side of the first injection device in a fuel flow passage from a fuel storage unit to the first injection device are provided. The first and second injection devices switch a flow passage extending downstream from the fuel flow passage, between a first flow passage via the first injection device and a second flow passage via the second injection device. The second injection device operates at a lower frequency than the first injection device during an operation of the fuel cell system.

According to another aspect of the present invention, a method for operating the fuel cell system is provided.

DESCRIPTION OF EMBODIMENTS

Figure 1:
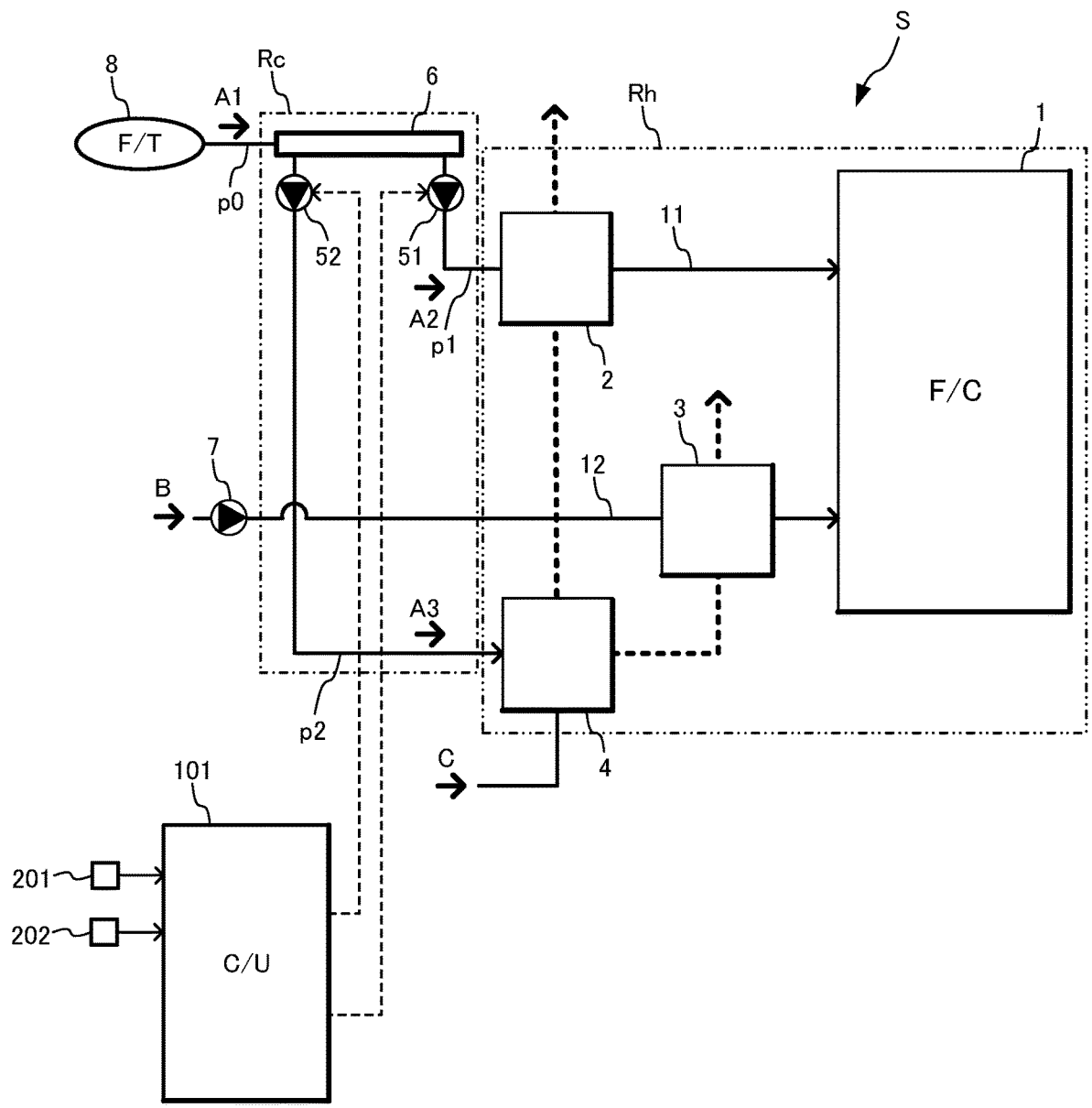
FIG. 1 is a schematic diagram showing an overall configuration of a fuel cell system according to an embodiment of the present invention.

Hereinafter, referring to the drawings, an embodiment of the present invention will be described.

(Overall Configuration of Fuel Cell System)

FIG. 1 schematically shows the configuration of a fuel cell system S according to the embodiment of the present invention.

The fuel cell system (hereinafter, referred to as a "fuel cell system" and simply referred to as a "system") S according to the present embodiment includes a fuel cell stack 1, a fuel processing unit 2, an oxidant gas heating unit 3, a combustor 4, and a controller 101 as a control unit.

The fuel cell stack (hereinafter, simply referred to as a "stack") 1 is formed by stacking a plurality of fuel cells or fuel cell unit cells. Each of the fuel cells, which is a power generating source, is a solid oxide fuel cell (SOFC), for example. In an anode system, the fuel cell stack 1 includes an anode gas passage 11 for supplying fuel gas to an anode electrode of the fuel cell and an anode off gas passage, not shown, for flowing anode off gas after the power generation reaction discharged from the anode electrode. On the other hand, in a cathode system, the fuel cell stack 1 includes a cathode gas passage 12 for supplying oxidant gas to a cathode electrode of the fuel cell and a cathode off gas passage, not shown, for flowing cathode off gas after the power generation discharged from the cathode electrode.

The fuel processing unit 2 processes raw fuel, which is primary fuel, and produces fuel gas used for a power generation reaction in the fuel cell. The fuel processing unit 2 is interposed in the anode gas passage 11 and receives the supply of the raw fuel from a fuel tank (corresponding to "fuel storage unit" or "raw fuel storage unit") 8 which is a storage unit mountable on a vehicle (arrows A1, A2). In this embodiment, the raw fuel is a water-containing oxygenated fuel, and specifically, is a mixture of ethanol, which is an oxygenated fuel, and water (ethanol water solution). The fuel processing unit 2 includes a vaporizer, a fuel heat exchanger and a reformer, receives the supply of the raw fuel from the fuel tank 8, and after vaporizing the raw fuel by the vaporizer and heating by the fuel heat exchanger, supplies hydrogen generated by the reformer to the fuel cell stack 1 as the fuel gas. The reformer includes a catalyst for reforming, and produces hydrogen from ethanol by steam reforming.

The oxidant gas heating unit 3 heats the oxidant gas. The oxidant gas heating unit 3 is interposed in the cathode gas passage 12 and receives the supply of the oxidant gas (arrow B). The oxidant gas is, for example, air, and by supplying air in the atmosphere to the cathode electrode of the fuel cell, it is possible to supply oxygen used in the power generation reaction to the cathode electrode. In the present embodiment, the oxidant gas heating unit 3 is configured as an air heat exchanger, heats air at a normal temperature (for example, 2° C.) and supplies the air to the fuel cell stack 1.

Here, the reaction related to power generation at the anode and cathode electrodes of the solid oxide fuel cell can be expressed by the following equations.

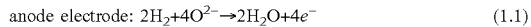

anode electrode: $2H_2 + 4O^{2-} \rightarrow 2H_2O + 4e^-$ (1.1)

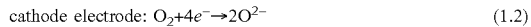

cathode electrode: $O_2 + 4e^- \rightarrow 2O^{2-}$ (1.2)

The combustor 4 burns the raw fuel and produces the combustion gas of the raw fuel. The combustor 4 receives the supply of raw fuel from the fuel tank 8 (arrows A1 and A3) and the supply of the oxidant gas (arrow C). In this embodiment, the combustor 4 includes a catalyst for combustion, and produces combustion gas by catalytic combustion of ethanol. The heat amount generated by the combustion of the raw fuel or the heat amount of the combustion gas can be supplied not only to the fuel cell stack 1 but also to the fuel processing unit 2 and the oxidant gas heating unit 3. FIG. 1 shows the transfer of the heat amount from the combustor 4 to the fuel processing unit 2 and the oxidant gas heating unit 3 by thick dotted lines. In the fuel processing unit 2, the vaporizer and the reformer are heated by the heat amount of the combustion gas, and the raw fuel (in the present embodiment, the ethanol gas after evaporation) can be heated by heat exchange with the combustion gas in the fuel heat exchanger. In the oxidant gas heating unit 3, the oxidant gas can be heated by heat exchange with the combustion gas.

The controller 101 controls the supply of the raw fuel and the oxidant gas to the fuel processing unit 2 and the oxidant gas heating unit 3, and controls the supply of the raw fuel and the oxidant gas to the combustor 4.

In the present embodiment, the supply of the raw fuel to the fuel processing unit 2 is performed by the first fuel injector (corresponding to the "first injection device") 51, and the supply of the raw fuel to the combustor 4 is performed by a second fuel injector (corresponding to the "second injection device") 52. The second fuel injector 52 is provided on the upstream side of the first fuel injector 51 in the middle of the flow passage (corresponding to the "fuel flow passage") p0 of the raw fuel from the fuel tank 8 to the first fuel injector 51. On the other hand, the supply of the oxidant gas to the oxidant gas heating unit 3 is performed by an air supply device 7 which is an air compressor, for example. The way of supplying of the oxidant gas to the combustor 4 is not limited to this, but it may be possible by the air supply device 7 shared with the oxidant gas heating unit 3 via passages (cathode gas passage, cathode off gas passage) in the cathode system of the fuel cell stack 1 by connecting the cathode off gas passage to the combustor 4.

Figure 4:
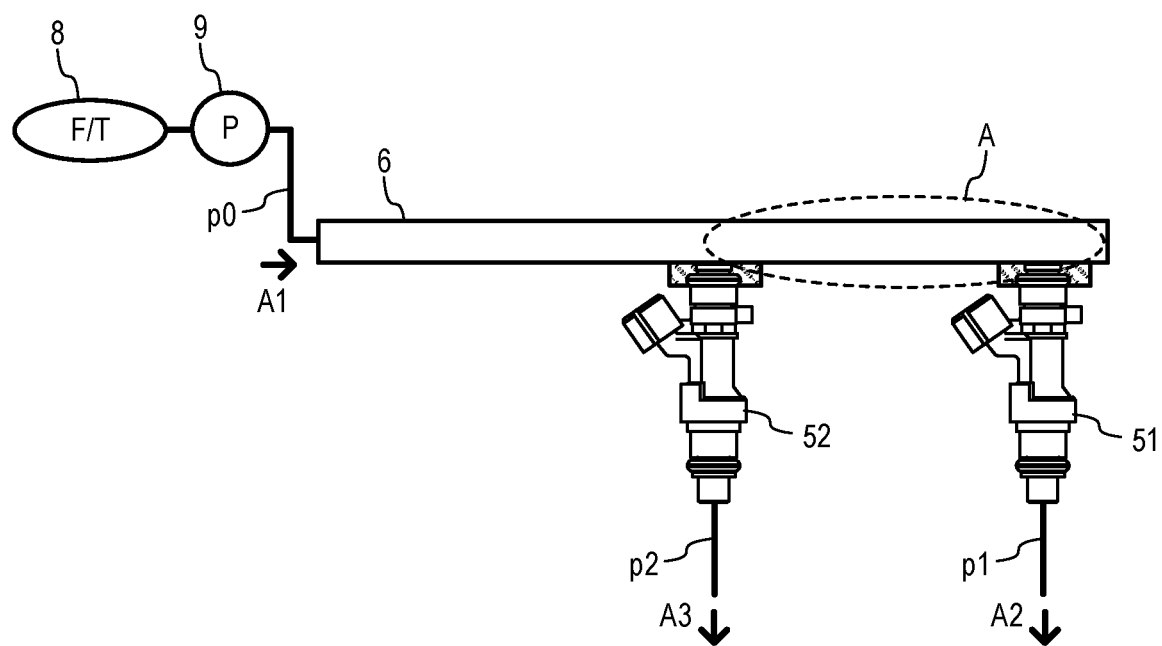
FIG. 4 is an explanatory diagram showing a positional relationship between a first fuel injector and a second fuel injector in the system.

Here, referring to FIG. 4, the configuration around the first and second fuel injectors 51 and 52 will be described in more detail. FIG. 4 shows the positional relation between the first fuel injector 51 and the second fuel injector 52 in the fuel cell system S.

In the present embodiment, of the anode gas passage 11 connecting the fuel tank 8 and the anode electrode of the fuel cell stack 1, a part of the fuel flow passage p0 from the fuel tank 8 to the first fuel injector 51 is formed by a fuel rail 6 shared by the first and second fuel injectors 51 and 52. Although not limited to this, the first fuel injector 51 is directly attached to a portion of the fuel rail 6 on the most downstream side in the flow direction without interposing another flow passage member such as a conduit. The second fuel injector 52 is directly attached to a portion on the upstream side of the first fuel injector 51, similarly to the first fuel injector 51. The fuel rail 6, on the upstream side, is connected to the fuel tank 8 via a fuel pump 9, on the downstream side, is connected to the fuel processing unit 2 via the first fuel injector 51 and a flow passage (corresponding to the "first flow passage") p1 following the downstream side thereof, and is connected to the combustor 4 via the second fuel injector 52 and a flow passage (corresponding to the "second flow passage") p2 following the downstream side thereof. The fuel flow passage p0 (including the fuel rail 6) extending from the fuel tank 8 and the flow passage p extending from first fuel injector 51 form a part of the anode gas passage 11.

Returning to FIG. 1, the first fuel injector 51, the second fuel injector 52 and the air compressor 7 operate in response to command signals from the controller 101. The first fuel injector 51 supplies the raw fuel to the fuel processing unit 2 via the first flow passage p1 following the fuel flow passage p0 (in the present embodiment, the fuel rail 6). The second fuel injector 52 introduces the raw fuel flowing in the fuel passage p0 into the second flow passage p2 different from the first flow passage p1, and supplies the raw fuel to the combustor 4 via the second flow passage p2. The connection between the first fuel injector 51 and the fuel processing unit 2, the connection between the second fuel injector 52 and the combustor 4 can be achieved by piping, respectively. In other words, the first fuel injector 51 is connected to the fuel processing unit 2 by a conduit forming the first flow passage p1, and the second fuel injector 52 is connected to the combustor 4 by a conduit forming the second flow passage p2.

In the present embodiment, the first fuel injector 51 and the second fuel injector 52 are provided at a position of the fuel cell system S where the temperature of the raw fuel becomes higher than the temperature in the fuel tank 8 during an operation of the fuel cell system S. Specifically, among the components of the fuel cell system S, the entire system S except for some parts like the air compressor 7, the fuel tank 8, the controller 101, is accommodated in a heat insulating case Rh, Rc. The inside of the insulating case Rh, Rc is roughly partitioned into two. One is a high temperature room (corresponding to "the first constant temperature room") Rh accommodating the fuel cell stack 1, the fuel processing unit 2, the oxidant gas heating unit 3 and the combustor 4. The other one is a low temperature room (corresponding to "the second constant temperature room") Rc accommodating the first and second fuel injectors 51 and 52. In the low temperature room Rc, a cooling water pipe is passed, and during the operation of the fuel cell system S, the internal temperature is maintained at a temperature lower than the high temperature room Rh. The air compressor 7, the fuel tank 8 and the controller 101 are located outside the insulating case Rh, Rc and are managed at a room temperature. FIG. 1 conceptually indicates an area of the high temperature room Rh by a two-dot chain line and an area of the low temperature room Rc by a one-dot chain line. Between the high temperature room Rh and the low temperature room Rc, in order to suppress the heat transfer from the high temperature room Rh to the low temperature room Rc, a heat insulating member (not shown) is installed. The first and second fuel injectors 51, 52 are connected to the fuel processing unit 2 and the combustor 4 via conduits passing through the heat insulating member. As an example, during the operation of the fuel cell system S, the temperature of the high temperature room Rh is 500-800° C. and the temperature of the low temperature room Rc between the outside air temperature and 200° C.

The power generated by the fuel cell stack 1 can be used to charge the battery or to drive an external device such as an electric motor or motor generator. For example, the fuel cell system S can be applied to a drive system for a vehicle, and charges the battery with the power generated by the rated operation of the fuel cell stack 1 and supplies the power corresponding to the target driving force of the vehicle from the battery to the motor generator for running.

(Configuration and Operation of Control System)

The operation of the first fuel injector 51, the second fuel injector 52, the air compressor 7, and other various devices or components used in the operation of the fuel cell system S is controlled by the controller 101. In the present embodiment, the controller 101 is configured as an electronic control unit, and includes a microcomputer including a central processing unit, various storage devices such as a ROM and a RAM, an input/output interface, and the like.

The controller 101, during a startup of the fuel cell system S (hereinafter sometimes referred to as "system startup"), executes a startup control for performing a warmup of the fuel cell system S, the fuel cell stack 1 that was in a low temperature state (e.g., room temperature) during stopping, to raise the temperature to the operating temperature. The operating temperature of the solid oxide fuel cell is 500° C. or higher. In the present embodiment, the temperature of the fuel cell stack 1 or the fuel cell is raised to the operating temperature by the startup control.

The controller 101 inputs signal from a stack temperature sensor 201 that detects the stack temperature $T_{stk}$ as information relating the startup control. The stack temperature $T_{stk}$ is an index indicating a temperature condition of the fuel cell stack 1 or the fuel cell. In the present embodiment, the stack temperature sensor 201 is installed near the cathode off gas outlet of the fuel cell stack 1, and the temperature detected by the stack temperature sensor 201 is regarded as the temperature $T_{stk}$. The controller 101 inputs the temperature of the fuel processing unit 2 (for example, the reformer) and the temperature of the combustor 4 as information relating the startup control in addition to the stack temperature $T_{stk}$. The temperature of the fuel processing unit 2 can be detected by installing a temperature sensor near the fuel gas outlet of the fuel processing unit 2. The temperature of the combustor 4 can be detected by installing a temperature sensor near the combustion gas outlet of the combustor 4.

During the system startup, the controller 101 determines whether or not to warmup the fuel cell system S based on the stack temperature $T_{stk}$. When it is determined that the temperature of the fuel cell system S is low and the warmup is required, the raw fuel in an amount corresponding to the stack temperature $T_{stk}$ is supplied to the combustor 4 via the second fuel injector 52, and the raw fuel is combusted by the combustor 4 to execute the warmup of the fuel cell system S.

In addition, the controller 101 performs the rated operation of the fuel cell stack 1, in other words, the operation at the maximum power generation output of the fuel cell stack 1, during a normal operation after the temperature of the fuel cell system S has risen and the warmup has been completed. The controller 101 sets the supply amount of the raw fuel required for the rated operation of the fuel cell stack 1, and supplies the raw fuel of this normal supply amount to the fuel cell system S (i.e., the fuel processing unit 2) via the first fuel injector 51.

Figure 5:
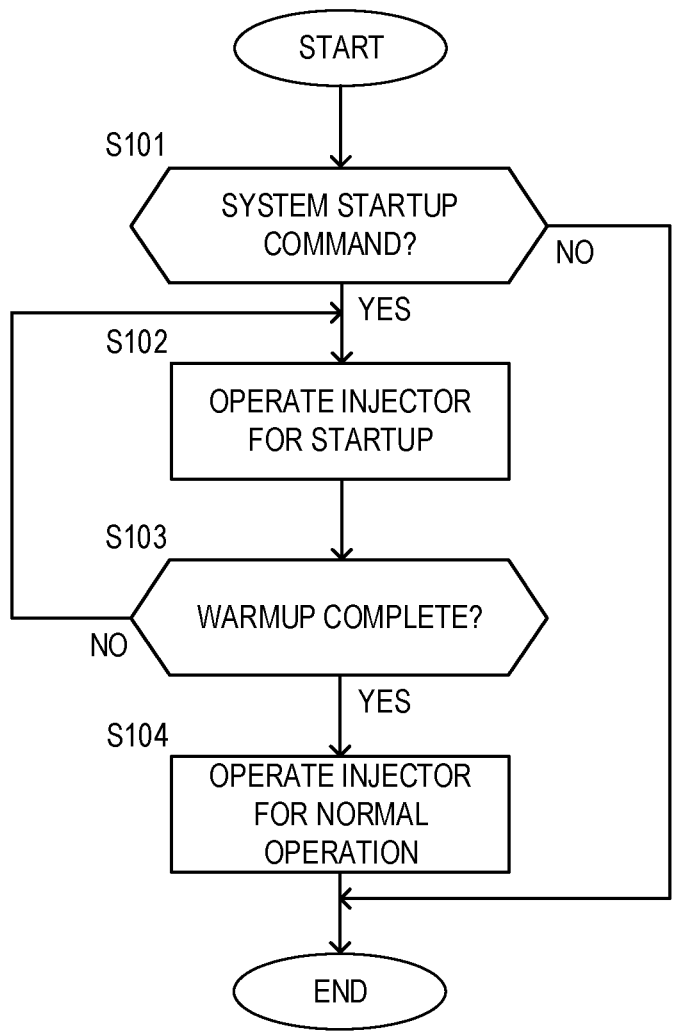
FIG. 5 is a flow chart showing the basic control flow of the system.

FIG. 5 is a flow chart showing a basic flow of control executed by the controller 101. In the present embodiment, the controller 101 is programmed to execute the control routines shown in FIG. 5 at predetermined intervals.

In S101, it is determined whether or not there has been an instruction to start the fuel cell system S. The presence or absence of the startup command can be determined based on whether or not a system start switch 202 has been turned on by a driver. When there is the startup command, the process proceeds to S102 to execute the startup control. Otherwise, the process waits until there is the startup command.

In S102, the second fuel injector 52 is operated to provide the combustor 4 with the raw fuel in an amount in accordance with the thermal condition of the fuel cell system S. More specifically, based on the stack temperature $T_{stk}$, the startup supply amount for causing the combustor 4 to generate the heat amount required for the warmup of the fuel cell system S is calculated, and the raw fuel of the startup supply amount is supplied to the combustor 4 via the second fuel injector 52. In the present embodiment, the startup supply amount is greater than the supply amount of the raw fuel required for the rated operation of the fuel cell stack 1, i.e., the normal supply amount. The second fuel injector 52 is a fuel injector having a higher injection flow rate than the first fuel injector 51.

In S103, it is determined whether the warmup of the fuel cell system S is completed. The completion of the warmup can be determined by determining whether the stack temperature $T_{stk}$ rises and reaches the predetermined temperature indicating the completion of the warmup. If the warmup is complete, proceed to S104 and if not, return to S102 and continue to operate the second fuel injector 52 to continue the warmup.

In S104, the startup control is terminated as the warmup of the fuel cell system S is completed, and the process proceeds to a normal control. In other words, the fuel injector to be operated is switched from the second fuel injector 52 to the first fuel injector 51, and the raw fuel in an amount of the normal supply amount is supplied to the fuel processing unit 2 by the first fuel injector 51.

(Operation Description of Fuel Cell System)

Figure 2:
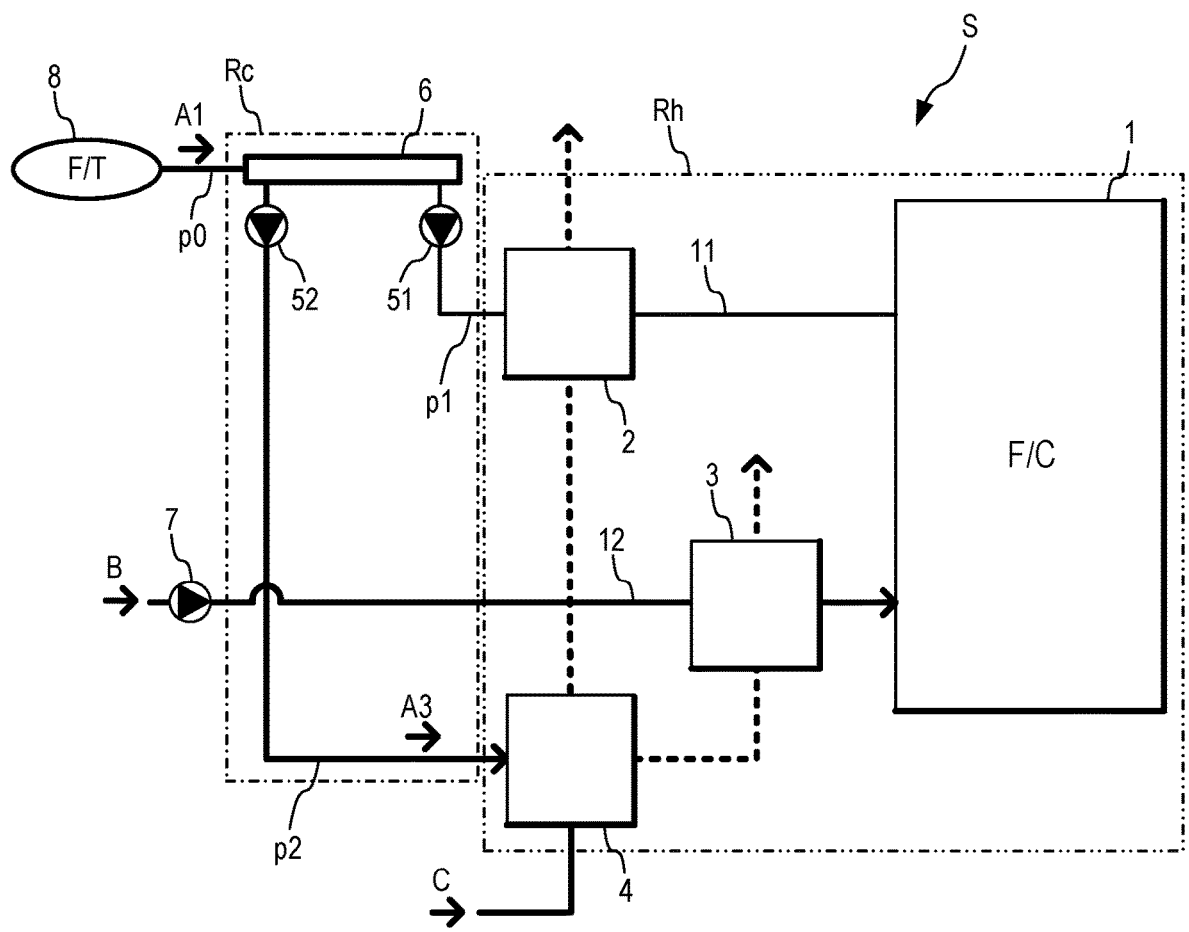
FIG. 2 is an explanatory diagram showing an operating state during a startup of the fuel cell system according to the embodiment.
Figure 3:
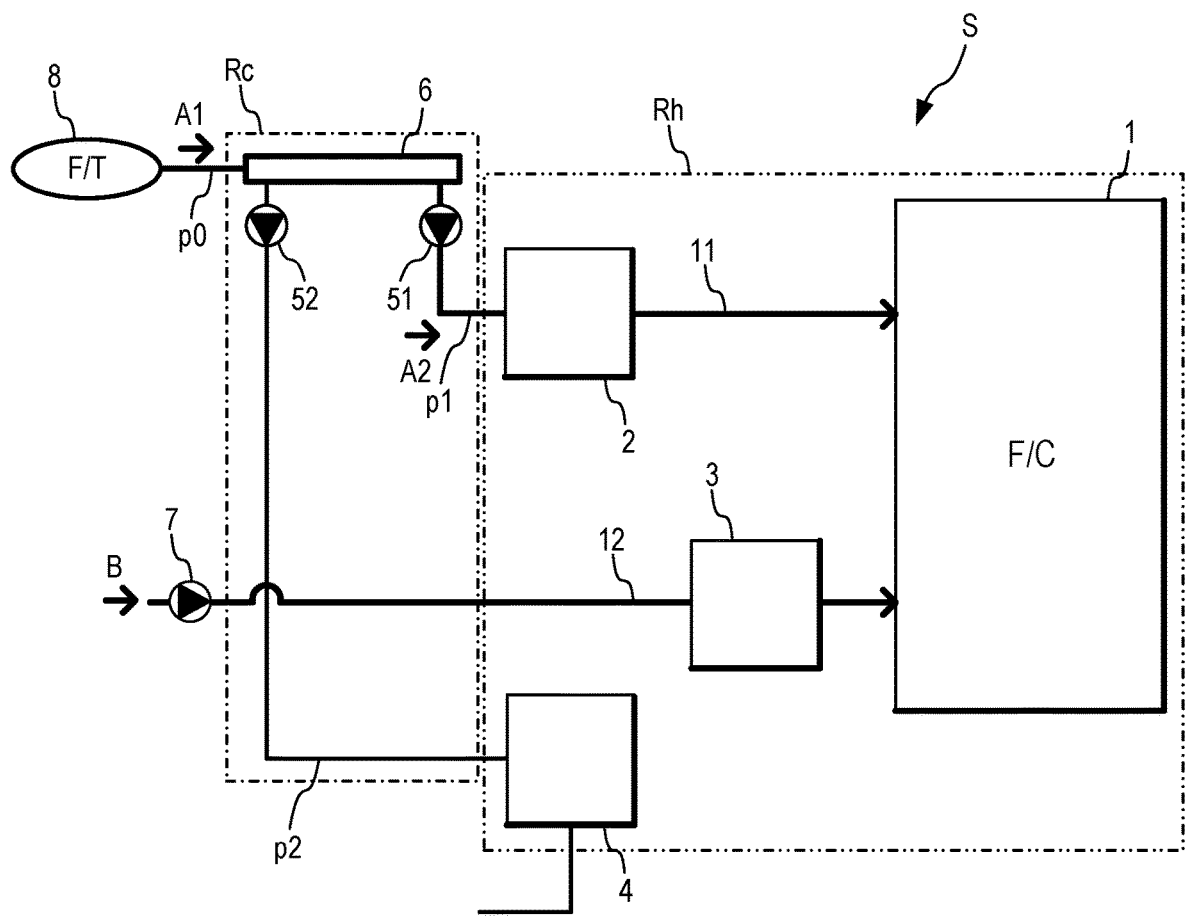
FIG. 3 is an explanatory diagram showing an operating state during a normal operation of the fuel cell system according to the embodiment.

FIGS. 2 and 3 show an operating state of the fuel cell system S. FIG. 2 indicates the operating state during the startup of the fuel cell system S, and FIG. 3 indicates the operating state during the normal operation after the system startup, i.e., after completion of the warmup. Among the passages of the anode system and the cathode system, the passage through which gas is actually flowing is indicated by an arrow of a thick solid line whereas the passage through which the flow of gas is stopped is indicated by a thin solid line.

During the system startup, the supply of the raw fuel via the first fuel injector 51 is stopped, the raw fuel required for the warmup of the fuel cell system S is supplied to the combustor 4 via the second fuel injector 52 (FIG. 2). On the other hand, the air compressor 7 is operated to supply the oxidant gas to the combustor 4. The heat amount generated by the combustion of the raw fuel heats the fuel processing unit 2 and the oxidant gas heating unit 3, thereby promoting the warmup of the fuel cell stack 1 and the fuel cell system S. "During the system startup" corresponds to the "system low temperature period" in which the fuel cell system S is in the low temperature state.

During the normal operation after the system is started, the operation of the second fuel injector 52 is stopped, and the raw fuel of the normal supply amount required for the rated operation of the fuel cell stack 1 is supplied to the fuel processing unit 2 via the first fuel injector 51 (FIG. 3). By connecting both the anode off gas passage and the cathode off gas passage (not shown) to the combustor 4, it is possible to combust the residual fuel in the anode off gas in the combustor 4. Thus, while supplying the heat amount required to continue the reforming of the raw fuel (steam reforming) to the fuel processing unit 2, it is possible to maintain the entire fuel cell system S at a temperature necessary for the operation. "During the normal operation" corresponds to the "system high temperature period" in which the fuel cell system S is in a high temperature state.

During the system startup and the subsequent normal operation, the pressure inside the fuel rail 6 is kept substantially uniform without significant uneven distribution, and thus substantially equivalent fuel pressure is applied on the first fuel injector 51 and the second fuel injector 52.

(Explanation of Effects)

The fuel cell system S according to the present embodiment is configured as described above, and the operation and effects obtained by the present embodiment will be described below.

First, in the fuel flow passage p0 (in the present embodiment, the flow passage formed by the fuel rail 6) from the fuel tank 8 to the first fuel injector 51, the first fuel injector 51 which operates at a higher frequency during the operation of the fuel cell system S is disposed on the downstream side, and the second fuel injector 52 which operates at a lower frequency than the first fuel injector 51 is disposed on the upstream side. Thus, when the operation of the second fuel injector 52 is stopped, it is possible to suppress stagnation in the flow of the raw fuel on the downstream side of the second fuel injector 52.

Specifically, referring to FIG. 4, by operating the first fuel injector 51 while stopping the second fuel injector 52, the flow of the raw fuel can still be ensured on the downstream side of the second fuel injector 52 (indicated by the dotted line A) in the fuel flow passage p0, stagnation is suppressed.

Thus, it is possible to suppress the influence of stagnation in the fuel passage p0 on the stopping second fuel injector 52 and the operating first fuel injector 51.

Specifically, in the fuel flow passage p0 from the fuel tank 8 to the first fuel injector 51, it is possible to secure the cooling effect using the raw fuel as a cooling medium and reduce a thermal load applied on the stopping second fuel injector 52. Thus, for example, it is possible to prevent an excessive thermal load from applying on resin members such as an O-ring used in the second fuel injector 52 and prevent an excessive progress of their deterioration.

Furthermore, it is possible to suppress the occurrence of a local increase in the temperature of the raw fuel in the fuel passage p0 due to stagnation, and stably supply the raw fuel to the fuel processing unit 2 via the first fuel injector 51.

Here, since the arrangement of the first fuel injector 51 is on the downstream side of the second fuel injector 52, stagnation occurs on the downstream side of the second fuel injector 52 when the first fuel injector 51 is stopped. However, since such a situation occurs only at a relatively low frequency during the operation of the fuel cell system S, it is possible to switch the operating fuel injector and mitigate the effect of stagnation before the effect of stagnation becomes too large.

The above effects are better obtained in the system S in which the first and second fuel injectors 51 and 52 are provided at a position where a temperature of the raw fuel becomes higher than a temperature of the raw fuel in the fuel tank 8. In the system S where the fuel cell stack 1 is accommodated in the high temperature room Rh (first constant temperature room) and the first and second fuel injectors 51 and 52 are accommodated in the low temperature room Rc (second constant temperature room), the warmup of the fuel cell stack 1 is promoted and, after the completion of the warmup, the temperature is kept. Further, it is also possible to suppress the heat reception of the first and second fuel injectors 51 and 52 for which the fuel cell stack 1 is a heat source.

Second, by operating the second fuel injector 52 during the warmup of the fuel cell system S and by operating the first fuel injector 51 during the normal operation after the completion of the warmup, it is possible to effectively obtain the above effects.

During the warmup, since the temperature of the entire fuel cell system S is low, even if the fuel flow passage p0 (in the present embodiment, the fuel rail 6) is affected by a heat amount of the combustion gas, the temperature of the fuel flow passage p0 does not increase greatly. Therefore, even if stagnation occurs downstream of the second fuel injector 52, it does not become a major issue in terms of a thermal load or the like on the second fuel injector 52. In contrast, during the normal operation after completion of the warmup, since the temperature of the entire fuel cell system S is relatively high and the temperature of the components constituting the system S is also high, the heat received by the fuel flow passage p0 is concerned. However, since stagnation in the fuel flow passage p0 is suppressed by devising the arrangement of the first and second fuel injectors 51 and 52, the cooling effect by the raw fuel is secured, and while reducing the thermal load on the second fuel injector 52, the raw fuel can be stably supplied to the fuel cell system S via the first fuel injector 51.

Third, since the injection characteristics of the first fuel injector 51 and the second fuel injector 52 are different, and the injection flow rate of the second fuel injector 52 is larger than that of the first fuel injector 51, in the system S in which supplying the more raw fuel is temporary, it is possible to suppress stagnation in the fuel flow passage p0 when the second fuel injector 52 is stopped during the normal operation. By supplying more raw fuel via the second fuel injector 52 during the warmup of the fuel cell system S, together with the above effects, it is possible to accelerate the progress of the warmup.

In the above description, the first fuel injector 51 and the second fuel injector 52 are mounted to the fuel rail 6, the first fuel injector 51 is disposed at the most downstream portion of the fuel rail 6, and the second fuel injector 52 is disposed at a substantially intermediate portion of the fuel rail 6. However, the arrangement of the first and second fuel injectors 51 and 52 is not limited thereto. Various modifications are possible as long as the second fuel injector 52 is disposed on the upstream side of the first fuel injector 51 in the direction of flow in the fuel flow passage p0.

FIGS. 6-9 illustrate variations of the arrangement of the first fuel injector 51 and the second fuel injector 52.

Figure 6:
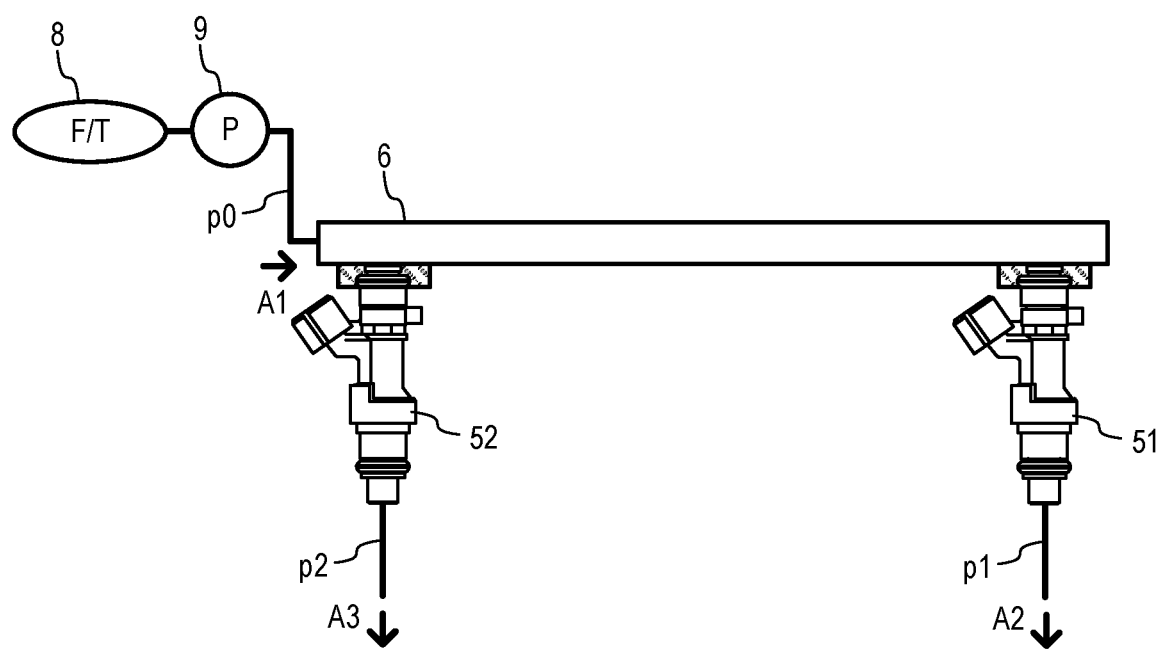
FIG. 6 is an explanatory diagram showing another example (first modification) of the positional relationship between the first fuel injector and the second fuel injector.

As a first modification, FIG. 6 shows a case where the first fuel injector 51 is disposed at the most downstream portion of the fuel rail 6 and the second fuel injector 52 is disposed at the most upstream portion in the flow direction of the raw fuel. The first fuel injector 51 and the second fuel injector 52 may be disposed close to each other or may be disposed apart from each other. By arranging the first fuel injector 51 at the most downstream portion, it is possible to suppress stagnation over the entire fuel rail 6, reduce fluctuations in the fuel pressure applied on the first fuel injector 51, and suppress a local temperature rise.

Figure 7:
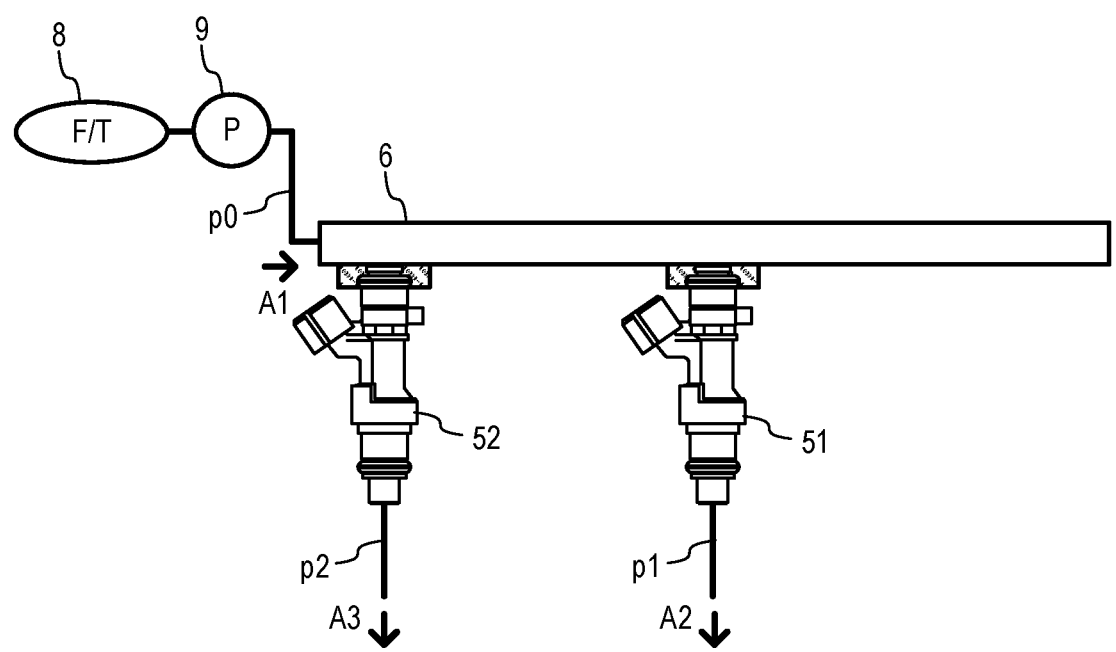
FIG. 7 is an explanatory diagram showing still another example (second modification) of the positional relationship between the first fuel injector and the second fuel injector.

FIG. 7 shows a second modification in which the second fuel injector 52 is disposed at the most upstream portion of the fuel rail 6 and the first fuel injector 51 is disposed at a substantially intermediate portion in the flow direction of the raw fuel. This arrangement results in stagnation on the downstream side of the first fuel injector 51. However, since the flow of the raw fuel at the portion where the second fuel injector 52 is disposed is maintained, it is possible to suppress the influence of stagnation on the second fuel injector 52.

Figure 8:
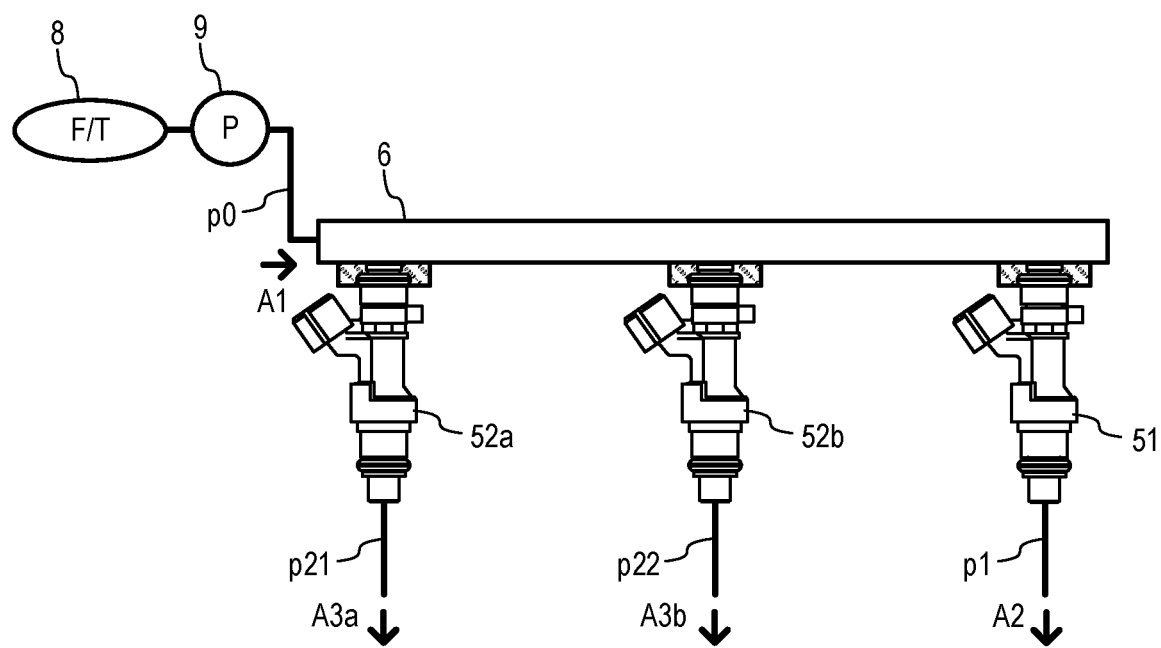
FIG. 8 is an explanatory diagram showing still another example (third modification) of the positional relationship between the first fuel injector and the second fuel injector.

FIG. 8 shows a third modification in which the first fuel injector 51 is disposed at the most downstream portion of the fuel rail 6 and the plurality of second fuel injectors 52a and 52b are disposed on the upstream side of the first fuel injector 51. The second fuel injector 52 need not be single. It is possible to install any number of second fuel injectors 52a, 52b corresponding to the number of the supply target(s) of the raw fuel. For example, the second fuel injectors 52a, 52b are installed for each combustor if a combustor for main combustion and a combustor for sub-combustion exist. If the frequency of operation between the main combustor and the sub combustor is different, the second fuel injector corresponding to the less frequent combustor is preferably located upstream.

Figure 9:
FIG. 9 is an explanatory diagram showing still another example (fourth modification) of the positional relationship between the first fuel injector and the second fuel injector.

As a fourth modification, FIG. 9 illustrates a case in which, in the direction of the raw fuel, the first fuel injector 51 is disposed at the most downstream portion of the fuel rail 6, the second fuel injector 52 is disposed at the most upstream portion, and further, the first fuel injector 51 is disposed such that the injection direction is parallel to the flow direction of the raw fuel in the fuel rail 6. Thus, not only suppressing stagnation over the entire fuel rail 6, but also making the flow of the raw fuel from the fuel rail 6 toward the first fuel injector 51 smooth, it is possible to more effectively suppress stagnation in the fuel rail 6.

The first and second fuel injectors 51 and 52 are mounted to the fuel rail 6, but not limited thereto. The fuel tank 8 and the first fuel injector 51 may be connected via conduits, and the second fuel injector 52 may be disposed in the middle of the pipe extending from the fuel tank 8 to the first fuel injector 51.

Furthermore, in the above description, the first fuel injector 51 and the second fuel injector 52 are alternatively operated, but the present invention is not limited thereto. It is also possible to operate both at the same time depending on the situation, while operating alternatively basically. For example, only the second fuel injector 52 is operated during the warmup. During the normal operation after the warmup is completed, while fuel is supplied basically by the first fuel injector 51, the second fuel injector 52 is also operated in addition to the first fuel injector 51 when heating is required due to a decrease in temperature or the like in the fuel processing unit 2.

While the present invention embodiment has been described above, the above embodiment is merely a part of the application examples of the present invention, and the technical scope of the present invention is not intended to be limited to the specific configuration of the above embodiment. Various changes and modifications can be made to the above-described embodiments within the scope of the claims.

The invention claimed is:

1. A fuel cell system comprising:
   a fuel cell;
   a fuel storage unit configured to store raw fuel;
   a fuel flow passage connected to the fuel storage unit, the fuel passage comprising a fuel rail;
   a first injection device mounted on the fuel rail at a first location and configured to receive the raw fuel from the fuel rail and to supply fuel to the fuel cell;
   a second injection device mounted on the fuel rail at a second location upstream of the first location and configured to receive the raw fuel from the fuel rail; and
   a controller programmed to control the first injection device and the second injection device such that:
      the first and second injection devices switch a flow of the raw fuel from the fuel storage unit between a first flow passage via the first injection device and a second flow passage via the second injection device, and
      the second injection device operates less frequently than the first injection device during operation of the fuel cell system.

2. A fuel cell system as defined in claim 1, wherein the controller is programmed to control the first injection device and the second injection device such that the first and second injection devices switch the flow of the raw fuel from the fuel storage unit alternatively between the first flow passage and the second flow passage.

3. A fuel cell system as defined in claim 1, wherein:
   the controller is programmed to control the second injection device to operate during a warmup of the fuel cell system; and
   the controller is programmed to control the first injection device to operate during normal operation other than during the warmup of the fuel cell system.

4. A fuel cell system as defined in claim 1, further comprising:
   a combustor; and
   a fuel processing unit configured to produce fuel gas for the fuel cell by processing the raw fuel; wherein:
   the second injection device is connected to the combustor via the second flow passage; and
   the first injection device is connected to the fuel processing unit via the first flow passage.

5. A fuel cell system as defined in claim 1, wherein an injection flow rate of the second injection device is higher than an injection flow rate of the first injection device.

6. A fuel cell system as defined in claim 1, wherein the first and second injection devices are provided at a position in the fuel cell system where a temperature becomes higher than a temperature of the fuel storage unit.

7. A fuel cell system as defined in claim 6, further comprising:
   a first constant temperature chamber in which the fuel cell is accommodated; and
   a second constant temperature chamber maintained at a temperature lower than a temperature of the first constant temperature chamber during the operation of the fuel cell system;
   wherein the first and second injection devices are accommodated in the second constant temperature chamber.

8. A fuel cell system as defined in claim 1, wherein an injection direction of the first injection device is parallel to a direction of the flow of the raw fuel in the fuel rail.

9. A fuel cell system, comprising:
   a fuel cell;
   a fuel storage unit configured to store raw fuel;
   a fuel flow passage connected to the fuel storage unit, the fuel flow passage comprising a fuel rail;
   a first injection device mounted on the fuel rail at a first location and configured to receive the raw fuel from the fuel rail and to supply fuel to the fuel cell;

a second injection device mounted on the fuel rail at a second location upstream of the first location and configured to receive the raw fuel from the fuel rail; and a controller programmed to control the first injection device and the second injection device such that the second injection device operates less frequently than the first injection device during operation of the fuel cell system.

10. A fuel cell system comprising:

a fuel cell;

a fuel storage unit configured to store raw fuel;

a fuel flow passage connected to the fuel storage unit, the fuel flow passage comprising a fuel rail;

a fuel processing unit configured to produce fuel gas for the fuel cell by processing the raw fuel;

a combustor configured to produce combustion gas by combusting the raw fuel;

a first injection device mounted on the fuel rail at a first location and configured to receive the raw fuel from the fuel rail and to supply the raw fuel to the fuel processing unit, a second injection device mounted on the fuel rail at a second location upstream of the first location and configured to receive the raw fuel from the fuel rail and to supply the raw fuel to the combustor;

a first combustion gas line configured to provide the combustion gas from the combustor to the fuel processing unit to heat the fuel processing unit; and a second combustion gas line configured to exhaust the combustion gas from the fuel processing unit separately from the fuel gas produced by the fuel processing unit.

11. A method for operating a fuel cell system having a plurality of injection devices for injecting raw fuel, comprising:

controlling an operation of:

a first injection device connected to a storage unit that stores the raw fuel and configured to receive the raw fuel from the storage unit, and a second injection device connected to the storage unit, the second injection device being located upstream of the first injection device on a fuel flow passage from the storage unit of the raw fuel to the first injection device and configured to receive the raw fuel from the fuel flow passage;

during a system high temperature period where the fuel cell system is in a high temperature state, stopping the second injection device while distributing the raw fuel from the first injection device to supply fuel to a fuel cell; and during a system low temperature period where the fuel cell system is in a low temperature state, stopping the first injection device while distributing the raw fuel from the second injection device to perform a warmup of the system.

* * * * *